United States Patent [19]

Azekura et al.

[11] Patent Number: 4,587,078
[45] Date of Patent: May 6, 1986

[54] INITIAL CHARGE CORE OF FAST BREEDER AND METHOD OF CHARGING THE CORE WITH FUEL

[75] Inventors: Kazuo Azekura, Ibaraki; Katsuyuki Kawashima, Hitachi; Kotaro Inoue, Ibaraki; Sadao Uchikawa, Katsuta, all of Japan

[73] Assignee: Hitachi, Ltd., Tokyo, Japan

[21] Appl. No.: 401,747

[22] Filed: Jul. 26, 1982

[30] Foreign Application Priority Data

Jul. 27, 1981 [JP] Japan ............................... 56-117924

[51] Int. Cl.[4] .................... G21C 19/00; G21C 1/00
[52] U.S. Cl. ...................................... 376/267; 376/173
[58] Field of Search ....................................... 376/267

[56] References Cited

U.S. PATENT DOCUMENTS

| | | | |
|---|---|---|---|
| 3,140,237 | 7/1964 | Peterson et al. | 376/173 |
| 3,382,153 | 5/1968 | Bigge et al. | 376/267 |
| 3,432,389 | 3/1969 | Stern | 376/267 |
| 3,664,923 | 5/1972 | Connolly | 376/267 |
| 3,928,128 | 12/1975 | Kollmar et al. | 376/267 |
| 4,326,919 | 4/1982 | Hill | 376/267 |

OTHER PUBLICATIONS

ANS Trans., 6/77, pp. 552-562.

Primary Examiner—Harvey E. Behrend
Attorney, Agent, or Firm—Antonelli, Terry & Wands

[57] ABSTRACT

An initial charge core of a fast breeder and a method of renewing fuel in the initial charge core. The initial charge core comprises a driver core region containing a fissile material, an external blanket region containing a fertile material and surrounding the driver core region, and an internal blanket region disposed within the driver core region and containing a fertile material. The axial thickness of the internal blanket region is greater at its central portion that at the peripheral portion thereof. The internal blanket region is enriched with the fissile material. The degree of enrichment in the internal blanket region is greater than that in the driver core region.

8 Claims, 13 Drawing Figures

INITIAL CHARGE CORE OF FAST BREEDER AND METHOD OF CHARGING THE CORE WITH FUEL

BACKGROUND OF THE INVENTION

The present invention relates to an initial charge core of a fast breeder and also to a method of charging the core with fuel. More particularly, the invention is concerned with an initial charge core of a fast breeder and a method of charging the reactor core with fuel, which are suitable for suppressing the fluctuation of power distribution in the transition period until the equilibrium core is obtained.

The fast breeder is a nuclear reactor of the type in which fast neutrons produced as a result of fission in the core are absorbed by a fertile material to produce new fissile material in the core. Namely, in the fast breeder, the new fissile material is produced at a rate higher than the rate of consumption of the fissile material by fission. It is possible to make an efficient use of the nuclear fuel by this production of new fissile material, i.e. by the breeding.

The core of the fast breeder usually has a columnar construction consisting of a driver core region containing the fissile material and a blanket region surrounding the driver core region and consisting mainly of the fertile material. The blanket region has a radial blanket region which surrounds the periphery of the driver core region and axial blanket regions which are disposed at both axial ends of the driver core region. The fissile material residing in the driver core region is mainly plutonium 239, while the fertile material in the blanket region consists mainly of uranium 238. The uranium 238 absorbs the fast neutrons produced mainly as a result of the fission of the plutonium 239 and is transformed into plutonium 239.

The driver core region is a region which contains the fuels consisting of enriched fissile material. On the other hand, the blanket region is a region which contains the fuels consisting mainly, at least when initial charging, of fertile material such as depleted uranium, natural uranium or the like material.

The most popular construction of the core generally referred to as "homogeneous core" has the driver core region which is divided into an inner core region and outer core region concentric with each other. In the reactor core having the core region divided into concentric regions as stated above, the degree of enrichment, i.e. the ratio of the amount of fissile material to the sum of the amount of the fissile produce and the amount of the fertile material, is greater in the outer core region than in the inner core region.

A reactor core called Parfait type core, employing a flat columnar inner blanket region having a uniform thickness and disposed at the axially central portion of the driver core region of the fast breeder, has been proposed by G. A. DUCAT et al., in "Evaluation of the Parfait Blanket Concept for Fast Breeder Reactors", C00-2250-5, MITNE-157, Massachusettes Institute of Technology, January 1974.

Also, K. Inoue et al. have proposed a core construction for fast breeders, in which an inner blanket region is disposed at the axial central portion of the driver core region as in the case of the Parfait type core, wherein the axial thickness of the inner blanket region is made greater at the peripheral portion of the inner blanket region than at the central portion of the same ("A Fast Breeder Core With Internal Blanket", Americal Nuclear Society Transactions, Vol. 33, p862 to 863, 1979).

The outer surface of the inner blanket region of this reactor core is in contact with the inner surface of the radial blanket region.

SUMMARY OF THE INVENTION

Accordingly, an object of the invention is to provide a construction of initial charge reactor core of fast breeder having an even power distribution.

Another object of the invention is to shorten the doubling time.

Still another object of the invention is to simplify the construction of fuel assembly to be newly loaded at the time of renewal of the fuel.

To these ends, according to the invention, there is provided an initial charge reactor core in which an internal blanket region disposed in a driver core region has a higher degree of enrichment of fissile material than that in the driver core region.

These and other objects, features and advantages of the invention will become clear from the following description of the preferred embodiment taken in conjunction with the accompanying drawings.

DESCRIPTION OF THE PREFERRED EMBODIMENTS

Figure 1:
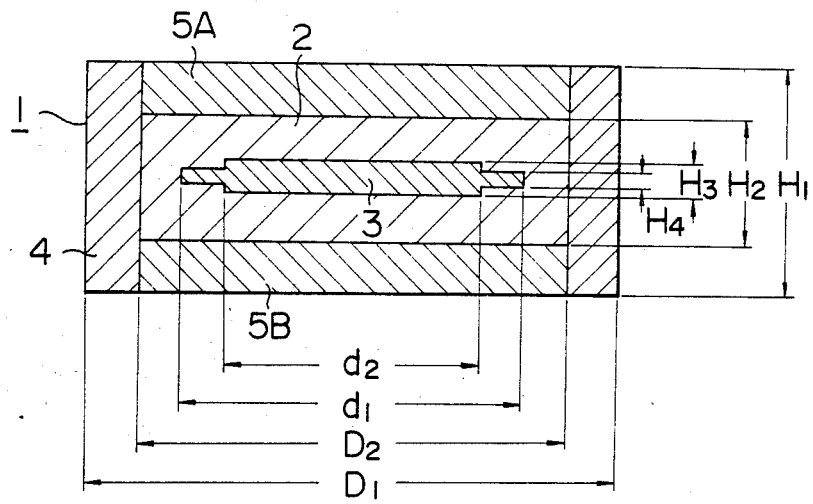
FIG. 1 is a schematic vertical sectional view of an equilibrium core in an axially heterogeneous reactor core structure.

The present invention has been accomplished through minute studies of the change in the power distribution in an axially heterogeneous reactor core structure as shown in FIG. 1, particularly through an investigation as to how the power distribution is changed as the state of the core is changed from the initial core in which the fuel is initially charged to the equilibrium core in which the equilibrium state of the fuel has been attained.

FIG. 1 schematically shows an axially heterogeneous core disclosed in the specification of the U.S. patent application Ser. No. 339,894 (filed on Jan. 18, 1982) entitled "Fast Breeder". This axially heterogeneous core, generally designated at a reference numeral 1, has a driver core region 2, an internal blanket region 3 and an outer blanket region. The driver core region 2 is surrounded by the outer blanket region which is composed of a radial blanket region 4 and both axial blanket regions 5A and 5B. The internal blanket region 3, extending horizontally, is disposed within the driver core region 2 substantially at the axial mid point of the latter. The internal blanket region 3 has an axial thickness which is greater at the radially central portion than at the radially outer or peripheral portion of the internal blanket region 3. Namely, the internal blanket region 3 has a flat columnar shape having a small axial height or thickness which is reduced at the peripheral portion thereof. The driver core region 2 fills the space between the internal blanket region 3 and the radial blanket region 4.

Figure 2:
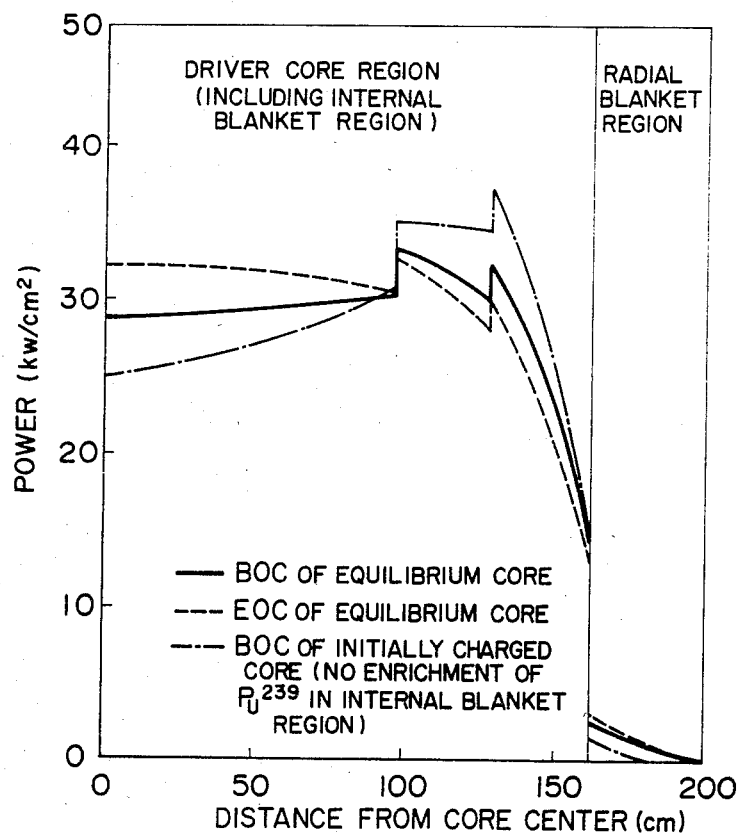
FIG. 2 is a characteristic diagram showing the radial power distributions in the equilibrium core shown in FIG. 1 and in an initial charge reactor core.
Figure 3:
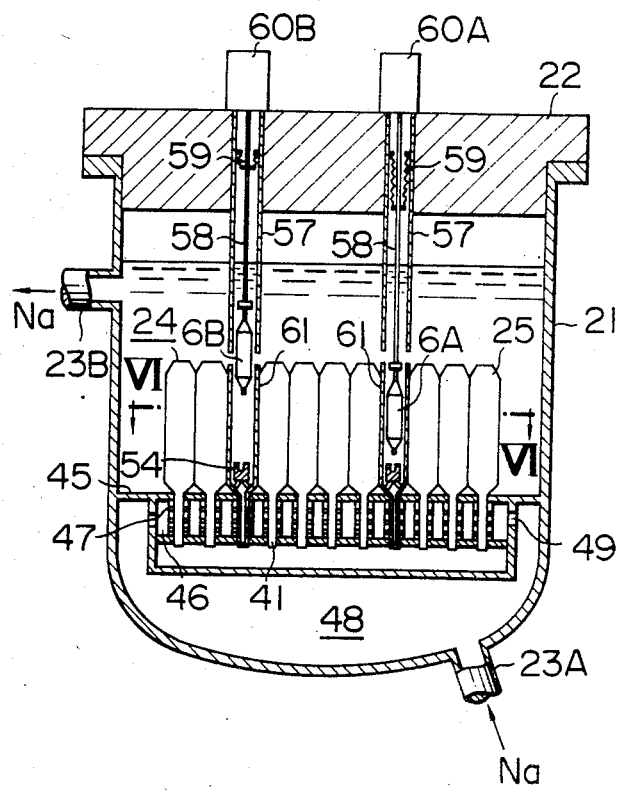
FIG. 3 is a vertical sectional view of a fast breeder having an initial charge core in accordance with a preferred embodiment of the invention.

The axially heterogeneous reactor core 1 contains natural uranium in its internal blanket and has reached an equilibrium state. Namely, the equilibrium state is reached in about 8 years after the initial start up of the fast breeder from the state of initial fuel charge. The reactor core in which the equilibrium state of fuel has been attained is generally referred to as "equilibrium core". FIG. 2 shows the radial power distribution exhibited by the equilibrium core in the axial heterogeneous reactor core 1. More specifically, in FIG. 2 the full-line curve shows the power distribution in the radial direction of the reactor core in the beginning of fuel cycle F(referred to as BOC, hereinunder), while the broken-line curve shows the radial power distribution in the end of fuel cycle (referred to as EOC, hereinunder). These radial power distributions are observed in a fast breeder having a thermal output power of 2500 MW. The principal dimensions of this fact breeder in connection with FIG. 1 are as follows. $D_1=405$ cm, $D_2=325$ cm, $d_1=256$ cm, $d_2=194$ cm, $H_1=175$ cm, $H_2=95$ cm, $H_3=22$ cm and $H_4=12$ cm.

In the axially heterogeneous reactor core 1, the axial thickness of the internal blanket region 3 is smaller at the peripheral portion than at the central portion of the internal blanket region 3 and the space between the internal blanket region 3 and the radial blanket region 4 is occupied by the driver core region 2. Therefore in this axially heterogeneous core 1, it is possible to suppress the swing between BOC and EOC in the equilibrium state, while attaining uniformalization of the power distribution. The term "swing between BOC and EOC" is used to mean a phenomenon in which the power in the central portion of the driver core region is excessively increased while the power in the portion of the drive core region between the internal blanket region and the radial blanket region is decreased as the fast breeder operates long. It will be understood that this swing can be suppressed in the axially heterogeneous core 1 in which the axial thickness $H_4$ of the peripheral portion of the internal blanket region 3 is smaller than the axial thickness $H_3$ of the central portion of the internal blanket region 3. The axial power distribution is remarkably uniformalized thanks to the presence of the internal blanket region 3 having a smaller axial thickness at the peripheral portion than at the central portion thereof and the existence of the driver core region 2 between the internal blanket region 3 and the radial blanket region 4.

The initial charge core in the axially heterogeneous core 1 exhibits a radial power distribution shown by one-dot-and-dash line in FIG. 2. Even in the initial charge core, natural uranium is contained by the external blanket region surrounding the driver core region 2 and by the internal blanket region 3 disposed in the driver core region 2, but the enrichment of plutonium 239 has not been achieved yet. Thus, the one-dot-and-dash line in FIG. 2 shows the power distribution in the radial direction of the reactor core as observed in BOC, i.e. when the fast breeder having the axially heterogeneous reactor core is operated for the first time after the building up. It will be seen that the radial power distribution in the initial charge core is much more uneven as compared with that in the equilibrium core.

The present inventors have made various studies to seek the cause of this uneven radial power distribution, and found that this uneven radial power distribution is attributable to the fact that plutonium 239 exists in the internal blanket region 3 even in the BOC of the equilibrium core, as will be realized from the following description.

Namely, in ordinary fast breeders, about one third ($\frac{1}{3}$) of all fuel assemblies in the reactor core is renewed every year. Thus, about $\frac{1}{3}$ of the fuel assemblies constituting the equilibrium core of the axially heterogeneous reactor core 1 is the fuel assemblies which are newly charged, while the remainder are the fuel assemblies charged one or two years ago. The newly charged fuel assemblies contain natural uranium (or depleted uranium) in the portion involved by the internal blanket region 3. However, as the operation time of the fast breeder grows long, the uranium 238 (fertile material) in the natural uranium (or depleted uranium) disposed in the area involved by the internal blanket region 3 is transformed into plutonium 239. Therefore, plutonium 239 is accumulated in the fuel assemblies other than the newly charged ones, in the portions thereof residing in the internal blanket region 3. On the other hand, the fuel assemblies in the initial charge core are the ones which are charged in the reactor core initially or for the first time, and the portions of these fuel assemblies involved by the internal blanket region 3 contain only natural uranium or depleted uranium and are materially devoid of plutonium 239. In consequence, an extremely uneven radial power distribution is exhibited as shown by one-dot-and-dash line in FIG. 2.

Under this circumstance, the present invention proposes to obtain an even radial power distribution in the initial charge core of an axially heterogeneous reactor core, by enriching a small amount of fissile material such as plutonium 239 in the internal blanket region containing natural uranium or depleted uranium.

The invention will be more fully understood from the following description of the preferred embodiments taken in conjunction with the accompanying drawings.

FIGS. 3 thru 7D in combination show a first embodiment of the invention.

A fast breeder has a reactor vessel 21 which is closed at its upper end by a rotary plug 22, an initial charge core 24 constituted by a multiplicity of fuel assemblies 25, and a core supporting plate 45 secured to the reactor vessel 21 and supporting the fuel assemblies 25. The fuel assemblies 25 are provided at their lower ends with entrance nozzles 41 which are adapted to be received by flow-rate regulating pipes 47 secured to the core supporting plate 45, whereby the fuel assemblies are held by the core supporting plate 45.

Figure 4:
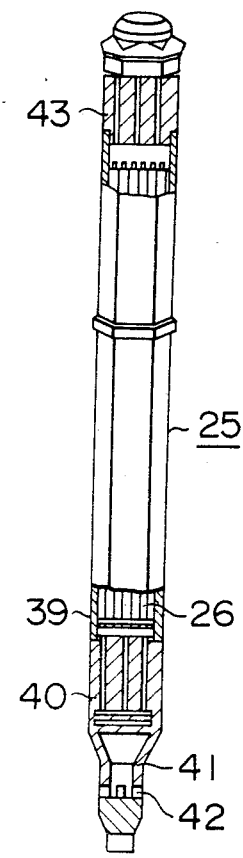
FIG. 4 shows the construction of a fuel assembly adapted to be charged in the initial charge core shown in FIG. 3.

FIG. 4 shows the construction of the fuel assembly 25. The fuel assembly 25 has as wrapper tube 39 to the upper and lower ends of which attached are an upper shielding member 43 and a lower shielding member 40, respectively. The wrapper tube 39 accomodates a multiplicity of fuel pins 26 which are secured to the lower shielding member 40. The liquid sodium (Na) as the coolant flows into the fuel assembly through an opening 42 formed in an entrance nozzle 41 attached to the lower shielding member 40.

The liquid sodium (Na) as the coolant, cooled by an intermediate heat exchanger (not shown) is introduced into a lower plenum 48 in the reactor vessel 21 through an inlet nozzle 23A. Then, the liquid sodium flows into a high-pressure plenum 46 through apertures 49 and then into the fuel assemblies 25 through the openings in the flow-rate regulating tube 47 and apertures 42. The liquid (Na) is heated to a high temperature by the heat produced in the fuel pins 26 within each fuel assembly 25. The hot liquid sodium (Na) flows to the outside of the reactor vessel 21 through an outlet nozzle 23B and is forwarded to the intermediate heat exchanger mentioned before.

Figure 5:
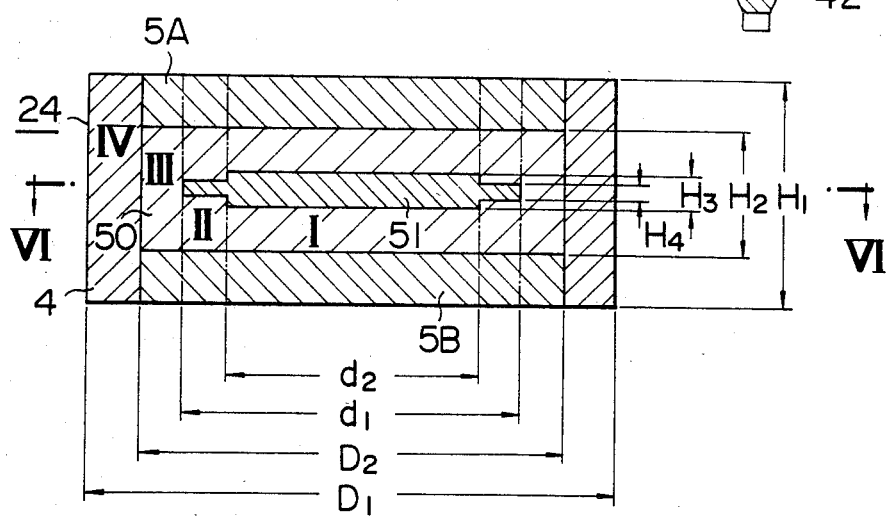
FIG. 5 is a schematic vertical sectional view of the initial charge core in accordance with the preferred embodiment shown in FIG. 4.
Figure 6:
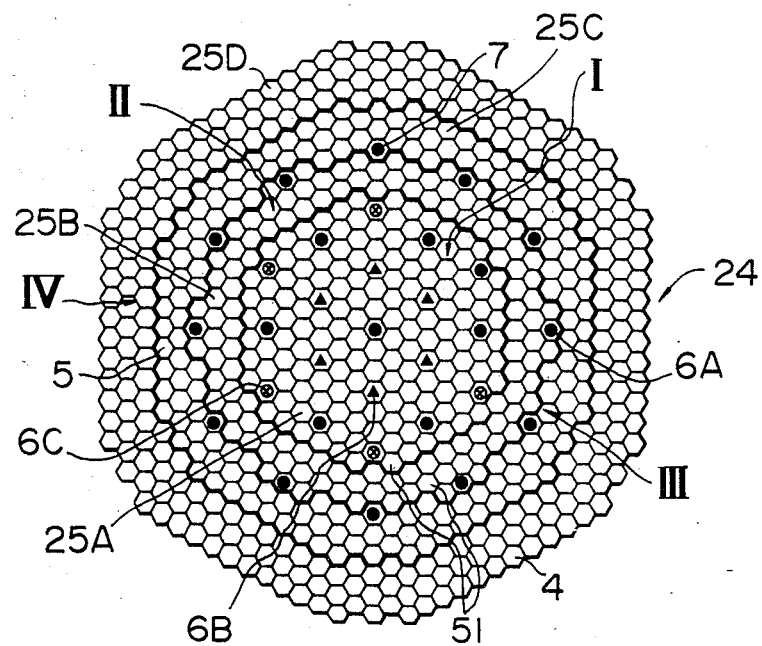
FIG. 6 is a sectional view taken along the line VI—VI in FIGS. 3 and 5.

FIG. 5 is a schematic vertical sectional view of the initial charge core of axially heterogeneous core 24 arranged in accordance with the described embodiment. The initial charge core 24 has an external blanket region composed of a radial blanket region 4 and axial blanket regions 5A, 5B, a driver core region 50 surrounded by the external blanket region and an internal blanket region 51 extending horizontally and disposed at axially central portion of the driver core region 50. The internal blanket region 51 has an axial thickness which is changed in a stepped manner. Namely, the axial thickness $H_4$ at the peripheral portion of the internal blanket region 51 is smaller than the axial thickness $H_3$ at the central portion of the same. In this initial charge core 24, the driver core region 50, internal blanket region 51 and the external blanket region are enriched in plutonium 239. Namely, the driver core region 50 contains 13 wt % (mean value) of enriched plutonium 239. Similarly, the internal blanket region 51 and the external blanket region contain 3 wt % (mean value) and 0.5 wt % of enriched plutonium 239, respectively. These enrichments or concentrations of plutonium 239 are equal to those in respective regions in the BOC of equilibrium core of the fast breeder having thermal output power of 2500 MW, and are the concentrations observed just before the start of operation of the fast breeder having the initial charge core 24, i.e. when the fast breeder having the initial charge core is just going to start to operate for the first time after the building.

As in the case of the axially heterogeneous core shown in FIG. 1, the initial charge core 24 can be divided into four regions: namely, a columnar first layer I containing the axially thick part of the internal blanket region 51, an annular second layer II containing the axially thin part of the internal blanket 51, an annular third layer III devoid of the internal blanket region 51 and a fourth layer IV constituting the radial blanket region 4. The second, third and fourth layers II, III and IV are arranged concentrically with and around the first layer I. The outermost peripheral surface of the internal blanket region 51 opposes to the radial blanket region 4 across the driver core region 50. The principal dimensions $D_1$, $D_2$, $d_1$, $d_2$, $H_1$, $H_2$, $H_3$ and $H_4$ are identical to those in the equilibrium core 1 shown in FIG. 1.

The constructions of the fuel assemblies to be charged in the first, second, third and fourth layers I, II, III and IV will be explained hereinunder with refrence to FIGS. 7A to 7D. The fuel assembly 25A to be charged in the first layer I incorporated fuel pins 26A shown in FIG. 7A as the fuel pins 26 of the fuel assembly 25 shown in FIG. 4. More specifically, the fuel pin 26A has a clad tube 27 plugged at its both ends with end plugs 28 and 29 and charged with two kinds of fuel pellets, i.e. driver core fuel pellets and blanket fuel pellets. More specifically, the clad tube 27 is provided therein with an upper blanket region 31A adjacent to the upper end plug 28, driver core region 32A underlying the upper blanket region 31A, intermediate blanket region 33 underlying the driver core region 32A, driver core region 32B underlying the intermediate or internal blanket region 33 and a lower blanket region 31B underlying the driver core region 32B. A gas plenum 34 for storing the gas produced as result of the fission is provided under the lower blanket region 31B. The blanket fuel pellets in the upper blanket region 31A and in the lower blanket region 31B are enriched with 0.5 wt % of plutonium 239. The intermediate blanket region 33 is charged with fuel pellets consisting of $PuO_2$-$UO_2$ enriched with 3 wt % of plutonium 239. The driver core regions 32A and 32B are charged with fuel pellets consisting of $PuO_2$-$UO_2$ enriched with 13 wt % of plutonium 239. The length of height $H_1$ between the upper end of the upper blanket region 31A and the lower end of the lower blanket region is 175 cm. A wire spacer 30 is attached to the outer peripheral surface of the clad tube 27.

Figures 7A, 7B, 7C, 7D:
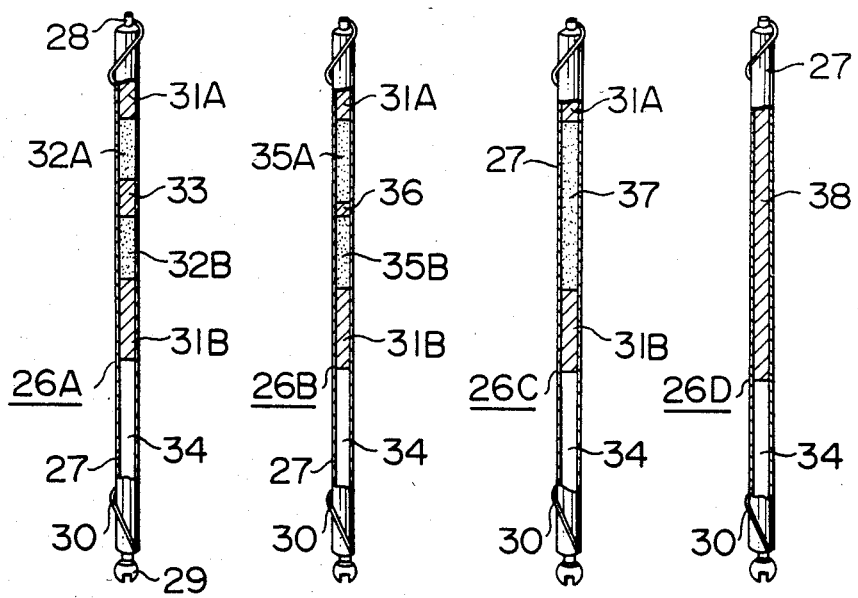
FIG. 7A is a vertical sectional view of a fuel pin constituting the fuel assembly to be charged in a first layer I in the initial charge core shown in FIG. 5.
FIG. 7B is a vertical sectional view of a fuel pin constituting a fuel assembly to be charged in a second layer II in the core shown in FIG. 5.
FIG. 7C is a vertical sectional view of a fuel pin constituting a fuel assembly to be charged in a third layer III of the core shown in FIG. 5.
FIG. 7D is a vertical sectional view of a fuel pin constituting a fuel assembly to be charged in a fourth layer IV in the core shown in FIG. 5.

The second layer II is charged with fuel assemblies 25B each of which incorporates fuel pins 26B shown in FIG. 7B. In the fuel pin 26B, the axial length of the driver core regions 35A, 35B is increased as compared with that of the driver core regions 32A, 32B of the fuel pin 26A, while the axial length of the intermediate blanket region 33 is reduced as compared with that of the intermediate region 33 of the fuel pin 26A. The driver core regions 35A, 35B contains 13 wt % of plutonium 239, while the intermediate blanket region 36 contains 3 wt % of plutonium 239.

The third layer III is constituted by fuel assemblies having fuel pins 26C shown in FIG. 7C. In the fuel pin 26C, a driver core region 37 charged with only driver core fuel pellets containing 13 wt % of plutonium 239 is disposed between an upper blanket region 31A and a lower blanket region 31B. A fuel pin 26D shown in FIG. 7D is provided at its portion above the gas plenum 34 in the clad tube 27 with a blanket region 38 which is charged only with blanket fuel pellets containing 0.5 wt % of plutonium 239. The fourth layer IV is constituted by fuel assemblies each consisting of the fuel pins 26D. The upper blanket region 31A and the lower blanket region 31B of the fuel pins 26A to 26C constitute the axial blankets 5A and 5B of the initial charge core 24, while the driver core regions 32A, 32B, 35A, 35B and 37 of the fuel pins 26A to 26C constitute the core region 50 of the initial charge core 24. Intermediate blanket regions 33 and 36 in the fuel pins 26A and 26B constitute the internal blanket region 51 of the initial charge core 24. The blanket region 38 of the fuel pin 26D constitutes the radial blanket region 4 of the initial charge core 24.

Three types of control rods, namely, adjusting rods 6A, safety rods 6B and back-up safety rods 6C, are used. All of these control rods employ $B_4C$ as the neutron absorber. The adjusting rods 6A are intended for making control of power of the fast breeder during the operation by, for example, compensating for the reduction in the power of the reactor due to consumption of fuel. The safety rods 6B are used for stopping the operation of the fast breeder. Namely, the safety rods 6B are usually held out of the driver core region 50 and are completely inserted into the driver core region 50 when it is required to stop the operation of the fast breeder for the renewal of fuel or in the case of scram. The back-up safety rods 6C have the same function as the safety rods 6B but are driven by a different driving mechanism from that for the safety rods 6B.

A plurality of lower guide tubes 61 are disposed in the axially heterogeneous core. A buffer 54 is disposed in each lower guide tube 61. Upper guide tubes 57 are fixed to the rotary plug 22 and are disposed on the extensions of the lower guide tubes 61. The control rods are adapted to be driven up and down in the upper and lower guide tubes 61, 57. Reference numerals 60A and 60B denote control rod driving devices secured to the rotary plug 22 and adapted to drive the adjusting rods 6A and safety rods 6B, respectively.

For starting up the fast breeder having the initial charge core 24, safety rods 6B and the back-up safety rods 6C are perfectly withdrawn from the driver core region 50, while the adjusting rods 6A are pulled out gradually from the driver core region 50. The full-line curve in FIG. 2 shows the radial power distribution as observed in the BOC of the initial charge core 24 of this embodiment, while the broken-line curve shows the radial power distribution in EOC of the same. Such power distributions are obtained because the internal blanket region 51 is enriched with 3 wt % of plutonium 239 to realize the state substantially equal to the equilibrium core.

Figure 8:
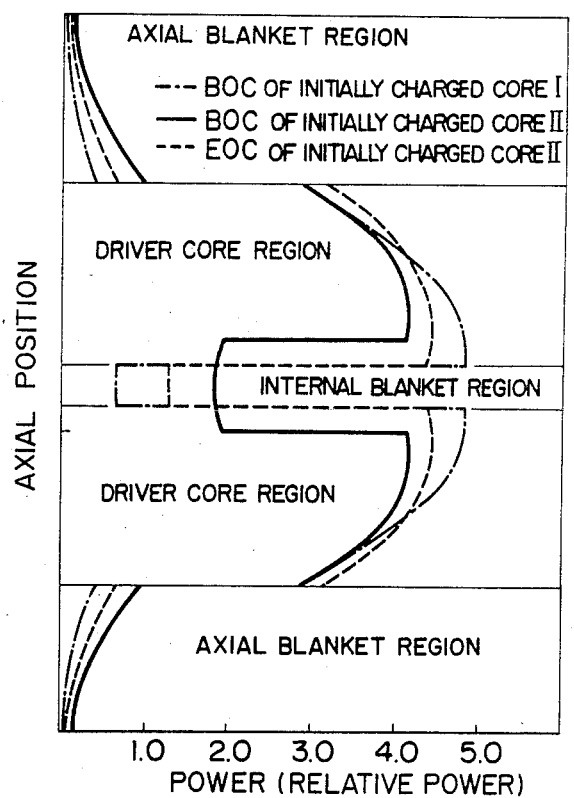
FIG. 8 is a characteristic diagram showing the axial power distribution in the initial charge reactor core shown in FIG. 5.

FIG. 8 shows the axial power distribution of the initial charge core 24. This axial power distribution is observed with a fuel assembly which provides the maximum power output in the initial charge core 24. The full-line curve in FIG. 8 shows the power distribution in BOC of the initial charge core (II) in which the internal blanket region 51 is enriched with plutonium 239, while the broken-line curve shows the power distribution in EOC of the same. It will be seen that also the axial power distribution is uniformalized in the initial charge core of this embodiment, as will be realized from a comparison with a power distribution shown by one-dot-and-dash curve which represents the power distribution in the initial charge core (I) of axially heterogeneous core structure in which the internal blanket region 51 is not enriched with plutonium 239.

As the fast breeder operates for 1 (one) year with the initial charge core 24, the first fuel cycle is completed to require a first fuel renewal. Since the period of fuel cycle is 1 year, the fuel renewal is conducted once a year thereafter. The renewal of fuel is conducted by a fuel renewing machine (not shown), after stopping the operation of the fast breeder by fully inserting the adjusting rods 6A, safety rods 6B and the back-up safety rods 6C into the driver core region 50. More specifically, these control rods are disconnected from associated driving devices after being fully inserted into the driver core region 50. The fuel renewing machine is mounted on the rotary plug 22 and is adapted to be moved to the position above the fuel assembly to be renewed, by the rotation of the rotary plug 22. The fuel renewing machine takes out a fuel assembly 25 from the initial charge core 24 and charges a new fuel assembly 25 in place of the taken-out fuel assembly. By repeating this operation, $\frac{1}{3}$ (one third) of all fuel assemblies 25 in the initial charge core 24 is replaced with new fuel assemblies 25. The fuel assemblies 25 to be renewed are dispersed uniformly over the first to fourth layers I to IV shown in FIG. 5. The basic structures of the newly charged fuel assemblies 25, except the plutonium 239 contents in respective blanket regions, are same as those of the fuel assemblies 25 charged in the initial charge core 24. Namely, the newly charged fuel assemblies 25 contain natural uranium at their portions corresponding to the blanket regions but these portions are not enriched with plutonium 239. More specifically, the fuel pin 26A constituting the fuel assembly 25 newly charged in the first layer I has the upper, intermediate and lower blanket regions which are filled with blanket fuel pellets (not enriched with plutonium 239) consisting of natural uranium. Similarly, the fuel assembly newly charged in the second layer II is constituted by fuel pins 26B each of which has the upper, intermediate and lower blanket regions filled with blanket fuel pellets consisting of natural uranium. The fuel assembly 25 newly charged in the third layer III is constituted by fuel pins 26C having the upper and lower blanket regions filled with blanket fuel pellets consisting of natural uranium. The fuel assembly 25 newly charged in the fourth layer IV includes fuel pins 26D each being filled with blanket fuel pellets consisting of natural uranium. The fuel assemblies 25 newly charged in the reactor core are easy to manufacture as compared with the fuel assemblies 25 initially charged in the initial charge core, because their blanket regions are not enriched with plutonium 239. The fuel assemblies 25, which are charged in the core in the subsequent fuel renewal operations are the fuel assemblies which do not contain plutonium 239 in their blanket regions. It is remarkable that the change of state of the reactor core from the initial charge core to the equilibrium core can easily be attained even with fuel assemblies having such a simple construction. This is attributable to the fact that the plutonium 239, which is produced as a result of absorption of neutrons by the fertile material (uranium 238) in the internal blanket regions, is accumulated in the internal blanket regions.

After the completion of the first fuel renewal, all control rods are pulled out from the driver core region 50 to start the second cycle of operation of the fast breeder. According to the described embodiment, a power distribution resembling that shown by full-line curves in FIGS. 1 and 8 is obtained even in BOC of the second cycle. This can be attributed to the fact that plutonium 239 has been accumulated during the first cycle of operation further in the portions corresponding to the internal blanket region of the fuel assemblies which are not taken out in the first fuel renewal operation.

In the described embodiment, the initial charge core 24 exhibits power distribution equal to that of the equilibrium core thanks to the enrichment of the internal blanket region 51 of the initial charge core 24 with plutonium 239. This facilitates the control of the power of the fast breeder in the transition period in which the state of the core is changed from the initial charge core 24 to the equilibrium core. This relates also to the fact that the fuel assemblies having no enrichment with plutonium 239 in their internal blanket regions are loaded in the core at the time of the fuel renewal.

Table 1 shows the characteristics of the 2500 MW fast breeder having the initial charge core 24 (II) shown in FIG. 5 with the internal blanket region 51 enriched with plutonium, in comparison with that of an initial charge core (I) in which the internal blanket region is not enriched with plutonium. Table 1 shows also the characteristics of the equilibrium core which are attained by repeated fuel renewals conducted on the initial charge core 24 of this embodiment.

TABLE 1

|  | Pu$^{239}$ enrichment (weight %) | | power peaking factor | breeding ratio | doubling time (year) |
|---|---|---|---|---|---|
|  | driver core region | internal blanket region | | | |
| initial charge core I | 14.0 | 0.0 | 1.62 | 1.36 | 17.1 |
| initial charge core II | 13.0 | 3.0 | 1.53 | 1.36 | 13.2 |
| equilibrium core | 12.0* | 0.0* | 1.53 | 1.29 | 13.2 |

These characteristics are obtained in BOC of respective cores. The doubling time are measured neglecting the out-of-pile inventory and reprocessing of the fuel. The degrees of plutonium 239 enrichment affixed with mark * appearing in the line of equilibrium core are the values for the fuel assemblies newly charged in the first and second layers I and II at the time of renewal of fuel. The number of the new fuel assemblies is ⅓ (one third) of the fuel assemblies in each of the first and second layers I and II. Namely, the intermediate blanket regions of other fuel assemblies in each of the first and second layers I and II have accumulation of plutonium 239. From Table 1, it will be understood that the power peaking factor can be remarkably lowered by enriching the internal blanket region of the initial charge core with plutonium 239, as compared with the initial charge core having no enrichment with plutonium 239. The doubling time is remarkably shortened also as a result of reduction in the power peaking factor.

In the embodiment described hereinbefore, fuel pellets consisting mainly of natural uranium (or depleted uranium) enriched with a predetermined amount of plutonium 239 are used as the fuel pellets filling the internal blanket 51 of the initial charge core 24, i.e. the intermediate blanket regions of the fuel pins 26A and 26B. This, however, is not exclusive and the internal blanket regions of the fuel, pins 26A, 26B may be filled with fuel pellets obtained from fuel assemblies wasted from a light-water unclear reactor or the fuel pellets in the intermediate blanket regions of fuel assemblies wasted from another fast breeder. In such a case, it is not necessary to take trouble of charging fissile material in the internal blanket region 51 of the initial charge core 24 and, hence, the production of the fuel is facilitated.

A certain part of the fuel assemblies in the initial charge core 24 is replaced with new fuel assemblies every year. The concentration of the fissile material accumulated in the intermediate blanket regions 33, 36 of the fuel assemblies initially charged in the initial charge core 24 is increased in proportion to the degree of burnup until the fuel assemblies are renewed. It is, therefore, possible to make comparatively small the degree of enrichment with the fissile material in the intermediate blanket region in the fuel assembly which is planned to be renewed later than others.

In the embodiment shown in FIG. 5, both of the internal blanket region 51 and the external blanket region are enriched with plutonium 239. The uniformalization of the power distribution over the initial charge core (I) shown in Table 1, however, is obtainable by enrichment of only the internal blanket region 51, but the enrichment in both regions with plutonium 239 is preferred for attaining higher uniformalization of the power distribution.

The invention is applicable to other types of axially heterogeneous core, as will be explained hereinunder with reference to FIGS. 9 and 10.

Figure 9:
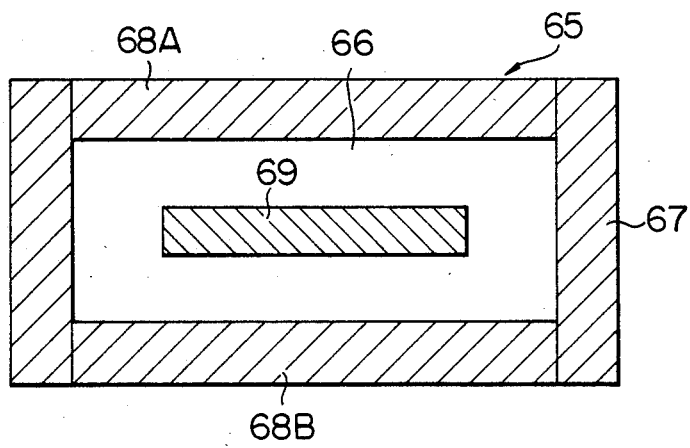
FIGS. 9 and 10 are schematic vertical sectional views of initial charge reactor cores in accordance with different embodiments of the invention.

FIG. 9 shows an axially heterogeneous core referred to as Parfait core 65 which is composed of a driver core region 66, an external blanket region constituted by a radial blanket region 67 and axial blanket regions 68A, 68B, and an internal blanket region 69 surrounded by the driver core region 66. As in the case of the embodiment described before, the internal blanket region 69 and the external blanket region of the initial charge core of this Parfait core 65 are enriched with plutonium 239. The degree of plutonium 239 enrichment is greatest in the driver core region 66 and is smallest in the external blanket region. Namely, the degree of plutonium 239 enrichment of the internal blanket region is intermediate between those of the driver core region and the external blanket region. The initial charge core of the Parfait core of this embodiment exhibits a power distribution which is much more uniform than that exhibited by the initial core of Parfait core having no enrichment with plutonium 239. In the case of the Parfait core, however, the swing of the power between BOC and EOC is large as compared with the axially heterogeneous core shown in FIG. 5 having the internal blanket region 51 thinner at the peripheral portion than at the central portion, because the internal blanket region 69 has a uniform axial thickness. In addition, the doubling time is somewhat longer (13.7 years) as compared with the embodiment shown in FIG. 5. As in the case of the first embodiment, when the fuel is renewed in this initial charge core, the new fuel assembly to be charged contains fuel pellets having no enrichment with plutonium 239 in the portion thereof corresponding to the internal blanket region 69.

Figure 10:
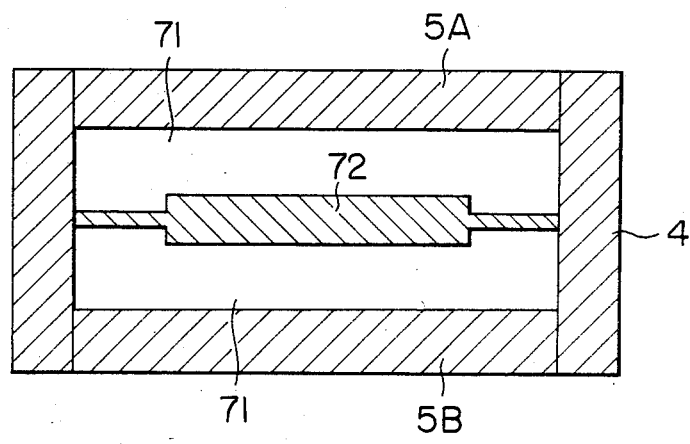

An axially heterogeneous core 70 shown in FIG. 10 has an internal blanket region 72 within the driver core region 71. As in the case of the embodiment shown in FIG. 5, the axial thickness of the internal blanket region 72 is greater at the central portion than at the peripheral portion thereof. The internal blanket region 72 contacts at its outer surface with the inner surface of the radial blanket region 4. In the initial charge core of this axially heterogeneous core, the degree of enrichment is greatest at the driver core region 71 and smallest at the external blanket region. The degree of plutonium 238 enrichment in the internal blanket region 72 is intermediate between those in the driver core region 71 and the external blanket region. In this embodiment also, the power distribution is much more uniformalized as compared with the case where the internal blanket region 72 is not enriched with plutonium 239. As in the preceding embodiments, fuel assemblies having blanket fuel pellets in which the portions corresponding to the internal blanket region 72 have no enrichment with plutonium 239 are newly charged at the time of fuel renewal. In this axially heterogeneous core 70, the swing of the power between BOC and EOC is effectively suppressed because the internal blanket region 72 is axially thinned at its peripheral portion. In this embodiment, however, the doubling time is somewhat longer (13.7 years) than that in the axially heterogeneous core shown in FIG. 5 because the internal blanket region 72 directly contacts the radial blanket region 4 without the medium of the driver core region therebetween. The reason of this elongation of doubling time is explained in the specification of the U.S. patent application Ser. No. 339,894.

In the initial charge core 24 shown in FIG. 5, the axial thickness of the internal blanket region at the peripheral portion thereof may be reduced progressively. In such a case, however, it is necessary to produce and use different fuel assemblies having different axial lengths of intermediate blanket region 36 for constituting the second layer II. In this connection, it is to be noted that the embodiment shown in FIG. 5, in which the internal blanket region 51 has a constant axial thickness at the peripheral portion thereof, facilitates the production of the fuel assemblies because only one kind of fuel assembly is required for the constitution of the second layer II.

As will be fully understood from the foregoing description, according to the invention, it is possible to remarkably uniformalize the power distribution in the initial charge core, so that the swing of the power between the initial charge core and the equilibrium core is suppressed effectively. This advantageously facilitates the control of power in the transition period in which the state of the core is changed from the initial charge core to the equilibrium core.

We claim:

1. A method of renewing fuel in an initial charge core of a fast breeder, said initial charge core comprising a driver core region containing a fissile material, an external blanket region surrounding said driver core region and containing a fertile material, and an internal blanket region disposed in said driver core region and containing a fertile material, each of said regions being composed of a multiplicity of fuel assemblies, said fuel assemblies including first fuel assemblies each of which constituting said external blanket region at its upper and lower ends, the driver core regions between said external blanket regions and said internal blanket region sandwiched between said driver core regions, said internal blanket region being enriched with a fissile material and the degree of enrichment in said internal blanket region being smaller than that in said driver core region, said method comprising the following steps (a) and (b):
   (a) stopping the operation of said fast breeder with said initial charge core after a predetermined running period has elapsed, and withdrawing said first fuel assemblies from said initial charge core; and
   (b) charging second fuel assemblies in the portions of said initial charge core from which said first fuel assemblies have been withdrawn, each of said second fuel assemblies constituting said outer blanket regions at its upper and lower ends, drive core regions between said outer blanket regions and an internal blanket region sandwiched between said driver core regions, said internal blanket region containing a fertile material which internal blanket region is not enriched with fissile material.

2. A method of renewing fuel in an initial charge core of a fast breeder according to claim 1, wherein said external blanket region of said first fuel assembly is enriched with fissile material, the degree of enrichment in said external blanket region being smaller than that of said internal blanket region.

3. A method of renewing fuel in an initial charge core of a fast breeder according to claim 1 or 2, wherein said internal blanket region of said first fuel assembly is composed of wasted fuel material.

4. A method of renewing fuel in an initial charge core of a fast breeder, said initial charge core comprising a driver core region containing a fissile material, an external blanket region surrounding said driver core region and containing a fertile material, and an internal core region disposed in said driver core region, the axial thickness of said internal blanket region being greater at the central portion than at the peripheral portion thereof, the outermost peripheral end of said internal blanket region opposing to said external blanket region with a portion of said driver core region interposed therebetween, said regions being composed of a multiplicity of fuel assemblies including first fuel assemblies each of which constituting external blanket regions at its upper and lower portions, the driver core regions between said outer blanket regions and said internal blanket region sandwiched between said driver core regions, said internal blanket region being enriched with a fissile material, the degree of enrichment with said fissile material in said internal blanket region being smaller than that in said driver core region, said method comprising the following steps (a) and (b):
   (a) stopping the operation of said fast breeder with said initial charge core after a predetermined running period has elapsed, and withdrawing said first fuel assemblies from said initial charge core; and
   (b) inserting second fuel assemblies into the portions of said initial charge core from which said first fuel assemblies have been withdrawn, each of said second fuel assemblies constituting said external blanket regions at the upper and lower ends thereof, said drive core regions between said external blanket regions and said internal blanket region sandwiched between said driver core regions, said internal blanket region containing a fertile material which internal blanket region is not enriched with fissile material.

5. A method of renewing fuel in an initial charge core of a fast breeder according to claim 4, wherein said external blanket region of said first fuel assembly is enriched with said fissile material, the degree of enrichment in said external blanket region being smaller than that in said internal blanket region.

6. A method of renewing fuel in an initial charge core in a fast breeder according to claim 4 or 5, wherein said internal blanket region of said first fuel assembly is constituted by a wasted fuel material.

7. A method of renewing fuel in an initial charge core of a fast breeder according to claim 1, wherein the step of withdrawing said first fuel assemblies includes withdrawing a predetermined number of said first fuel assemblies, which predetermined number is less than the total number of said first fuel assemblies in the initial charge core.

8. A method of renewing fuel in an initial charge core of a fast breeder according to claim 4, wherein the step of withdrawing said first fuel assemblies includes withdrawing a predetermined number of said first fuel assemblies, which predetermined number is less than the total number of said first fuel assemblies in the initial charge core.

* * * * *